United States Patent
Jiang

(10) Patent No.: US 8,275,114 B2
(45) Date of Patent: Sep. 25, 2012

(54) METHOD AND SYSTEM FOR IMPLEMENTING RING BACK TONES AND RING BACK IMAGES IN THE VP SERVICE

(75) Inventor: Haitao Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1132 days.

(21) Appl. No.: 11/886,089

(22) PCT Filed: Mar. 13, 2006

(86) PCT No.: PCT/CN2006/000369
§ 371 (c)(1),
(2), (4) Date: Feb. 14, 2008

(87) PCT Pub. No.: WO2006/094466
PCT Pub. Date: Sep. 14, 2006

(65) Prior Publication Data
US 2008/0129815 A1 Jun. 5, 2008

(30) Foreign Application Priority Data
Mar. 11, 2005 (CN) .......................... 2005 1 0024323

(51) Int. Cl.
*H04M 3/00* (2006.01)
(52) U.S. Cl. ..................................... 379/251; 455/414.1
(58) Field of Classification Search .......... 379/202.01, 379/251, 257; 455/414.1
See application file for complete search history.

(56) References Cited

U.S. PATENT DOCUMENTS

| | | | |
|---|---|---|---|
| 7,813,490 B2 * | 10/2010 | DeMent et al. | 379/221.03 |
| 8,027,455 B2 * | 9/2011 | Moody et al. | 379/257 |
| 8,131,265 B2 * | 3/2012 | Cheng et al. | 455/412.2 |
| 2001/0036197 A1 * | 11/2001 | Kakiuchi | 370/466 |
| 2002/0183048 A1 | 12/2002 | Takeuchi | |
| 2005/0213155 A1 * | 9/2005 | Ciccarelli | 358/1.18 |
| 2006/0147010 A1 * | 7/2006 | Batni et al. | 379/202.01 |
| 2007/0207782 A1 * | 9/2007 | Tran | 455/414.1 |
| 2007/0224973 A1 * | 9/2007 | Park et al. | 455/412.2 |
| 2007/0280209 A1 * | 12/2007 | Ramani | 370/356 |
| 2008/0101554 A1 | 5/2008 | Rhee et al. | |

(Continued)

FOREIGN PATENT DOCUMENTS
CN 1335015 A 2/2002
(Continued)

OTHER PUBLICATIONS

English language translation of Written Opinion of PCT/CN2006/000369, mailed Jun. 22, 2006 (4 pages).

(Continued)

*Primary Examiner* — Curtis Kuntz
*Assistant Examiner* — Maria El-Zoobi
(74) *Attorney, Agent, or Firm* — Finnegan, Henderson, Farabow, Garrett & Dunner LLP

(57) ABSTRACT

A method and a system for implementing ring back tones and ring back images in the VP service provides quality-assured and customized ring back tones and ring back images. A control module plays the ring back tones and ring back images for calling UEs through a voice and image channel defined in the VP series of protocols by resolving or pre-negotiating the voice and image coding formats supported by the calling UEs.

16 Claims, 6 Drawing Sheets

U.S. PATENT DOCUMENTS

| | | | |
|---|---|---|---|
| 2008/0102800 A1* | 5/2008 | Cheng et al. | 455/412.2 |
| 2008/0175356 A1* | 7/2008 | Seidberg et al. | 379/45 |

FOREIGN PATENT DOCUMENTS

| | | | |
|---|---|---|---|
| CN | 1538707 | A | 10/2004 |
| CN | 1547395 | A | 11/2004 |
| CN | 1549544 | A | 11/2004 |
| CN | 1813466 | A | 8/2006 |
| CN | 100454944 | C | 1/2009 |
| JP | 11-205351 | | 7/1999 |
| JP | 2002-368882 | | 12/2002 |
| JP | 2003-052073 | | 2/2003 |
| JP | 2003-274016 | | 9/2003 |
| JP | 2004-312357 | | 11/2004 |
| KR | 10-2002-0024479 | | 3/2002 |
| KR | 10-2004-0082758 | | 9/2004 |
| KR | 10-2004-0090875 | | 10/2004 |
| KR | 20050011658 | A | 1/2005 |
| WO | WO 2004/084566 | | 9/2004 |
| WO | WO 2005/009015 | A | 1/2005 |

OTHER PUBLICATIONS

Notice of Reasons for Rejection of JP 2008-500032, mailed Apr. 23, 2010 (2 pages).

Office Action of EP 06722028.5, dated May 11, 2010 (5 pages).

Extended European Search Report of EP 06722028.5, dated Apr. 15, 2008 (7 pages).

Digital cellular telecommunications system (Phase 2+); Universal Mobile Telecommunications System (UMTS); Multimedia Messaging Service (MMS); Functional Description; Stage 2 (3GPP TS 23.140 version 4.8.0 Release 4), ETSI TS 123 140; (Sep. 2002).

Digital cellular telecommunications system (Phase 2+); Universal Mobile Telecommunications System (UMTS); IP Multimedia Subsystem (IMS); Stage 2 (3GPP TS 23.228 version 5.13.0 Release 5), ETSI TS 123 228; (Dec. 2004).

$3^{rd}$ Generation Partnership Project; Technical Specification Group Core Network; Mobile radio interface layer 3 specification; Core Network Protocols; Stage 3 (Release 1999); 3GPP TS 24.008 (Sep. 2003).

$3^{rd}$ Generation Partnership Project; Technical Specification Group RAN; UTRAN Functions, Examples on Signalling Procedures (Release 5); 3GPP TR 25.931 (Jun. 2002).

Notice of Office Action from the Korean Intellectual Property Office issued Apr. 14, 2009, in Application No. 10-2007-7022071 and English translation thereof (6 pages total).

International Search Report from the Chinese Patent Office for International Application No. PCT/CN2006/000369.

Final Notice of Office Action from the Korean Intellectual Property Office issued Mar. 17, 2010, in Application No. 10-2007-7022071 and English translation thereof (10 pages total).

ITU-T H.324 (Mar. 2002), Telecommunication Standardization Sector of ITU, Series H: Audiovisual and Multimedia Systems, Infrastructure of audiovisual services—Systems and terminal equipment for audiovisual services, Terminal for low bit-rate multimedia communication, dated Mar. 2012.

Request for Invalidation of Patent Right dated (mailed) Feb. 15, 2012, issued in related Chinese Application No. 200510024323.5.

European Patent Office Communication pursuant to Article 94(3) EPC, European search opinion for Application No. 06722028.5-2414, mailed Jan. 25, 2012 Huawei Technologies C., LTD 6 pgs.

* cited by examiner

METHOD AND SYSTEM FOR IMPLEMENTING RING BACK TONES AND RING BACK IMAGES IN THE VP SERVICE

FIELD OF THE INVENTION

The present invention relates to the field of mobile communication technologies, particularly to Video Phone (VP) technologies.

BACKGROUND OF THE INVENTION

With the development of mobile communication technologies and growth of network scale and number of users, users' requirements tend to be more diversified and personalized, which lays an extensive foundation for launch of various value-added services such as downloading of ring tones and Multimedia Messaging Service (MMS).

If mobile operators can fully use existing network resources to provide users with rich and diversified value-added services, they can increase their market shares and improve market competitiveness on the one hand; on the other hand, they can expand their existing user groups, fully utilize phone networks, enhance their competitive power and improve the cost-effectiveness of the whole networks.

Among value-added services, Coloring Ring Back Tone (CRBT) service is effective when a UE is called. To be specific, a UE who subscribes to this service may set and manage ring back tones in various ways, and anyone who calls this UE will hear a personalized ring back tone set by the user, instead of a monotonous beep tone. A customized ring back tone may be a piece of music or a message set by the called UE.

The CRBT service caters to the requirement of fashionable and young users for showing off their personalities. Users can indirectly treat people such as friends, lovers, customers and unwelcome ones by categories by managing tones although they are the called parties in calls. In addition to individual users, the service is also valuable to enterprises. Enterprises can add advertisements to ring back tones or play the specified ring back tones for different customers so that customers can feel the hospitality. Therefore, the CRBT service has extensive user groups.

With the development and improvement of 3G technologies, the networks provide more and more functions, which provide more convenient platforms for launch of value-added services. It is well-known that VP is an important feature of a 3G mobile communication system compared with a $2^{nd}$ Generation (2G) mobile communication system. Both the Wideband Code Division Multiple Access (WCDMA) system and the Time Division Synchronous Code Division Multiple Access (TD-WDMA) system can provide the VP service based on the 64 kbps circuit switching (CS) bearer to realize simultaneous interactive transmission of audio and video.

FIG. 1 and FIG. 2 show the signaling process for a calling UE in the VP service. FIG. 2 is the subsequent process of FIG. 1. The signaling flow in FIG. 1 and FIG. 2 relates to the following network entities: User's Equipment (UE), Radio Network Subsystem (RNS), Radio Network Controller (RNC) and Core Network (CN). The protocol layers relating to these network entities include Radio Resource Control (RRC), Node-B Application Part (NBAP), ATM Adaptation Layer 2 (AAL2), Dedicated Channel—Frame Protocol (DCH-FP), Radio Link Control (RLC) and Radio Access Network Application Part (RANAP). The process includes setup of channels, exchange of related information and release of channels. The technical personnel that are familiar with this field can understand that the VP series of protocols are transparent to the CN and that related information, without being processed by the CN, is directly transferred by the CN to the UE via the serving RNC.

In the WCDMA system and the TD-SCDMA system, the CN provides UEs with two options for processing of ring back tones: playing ring back tones by Called UEs, or providing ring back tones by the CN. For the former, called UEs play ring back tones that they store according to the information elements (IEs) in the Alerting message sent from the CN; for the latter, called UEs play ring back tones provided by the CN.

In the prior technical solution, 12.2 kbps voice UEs are provided with tone files in the CN protocol framework. The CN can realize the CRBT over a 12.2 kbps voice channel.

In actual application, the following problem exists in the above solution: When the prior CRBT technology is applied in the VP service, the effects of ring back tones differ greatly and ring back images cannot be implemented.

The following analyzes reasons for this problem: The performance and quality of called UEs differ greatly and ring back tones are not uniformly customized by the network. To be specific, in the prior technical solution, the CN sets up a transparent channel for the VP service. The protocol layer of the CN does not resolve high-layer VP images or voices. Therefore, the CN cannot simply play ring back tones customized by the network over a 12.2 kbps voice channel for calling UEs. Due to the difference in processing among UEs, the ring back tones not customized by the network over the transparent channel show different playing effects on UEs. In addition, as defined in related protocols, only voice is available for the VP service, and ring back images related to ring back tones are unavailable. The CN cannot play customized ring back images for calling UEs.

SUMMARY OF THE INVENTION

An embodiment of the invention is to provide a method for implementing ring back tones and ring back images in the VP service, so that the VP service can provide quality-assured and uniformly customized ring back tones and ring back images.

Another embodiment of the invention is to provide a system for implementing ring back tones and ring back images in the VP service, so that the VP service can provide quality-assured and customized ring back tones and ring back images.

Another embodiment of the invention is to provide a device for implementing ring back tones and ring back images in the VP service, so that the VP service can provide quality-assured and customized ring back tones and ring back images.

The method for implementing ring back tones and ring back images in the VP service in an embodiment of the invention may include:

obtaining, by a control module, the voice and image coding formats supported by a calling UE in the VP service;

playing, by the control module, ring back tones and ring back images for the calling UE in the voice and image coding formats through a voice and image channel defined in VP series of protocols.

The method is executed when the control module prepares to send a Direct Transfer message for alerting to the RNC, or before the control module prepares to send a Direct Transfer message for connection to the RNC after receiving a radio access bearer (RAB) Assignment Response.

The above method further includes:

stopping playing the ring back tones and ring back images after receiving a Connect or Disconnect message from a called UE in the VP service.

The obtaining the voice and image coding formats includes:

parsing interactive Information Elements, IEs, between the calling UE and the called UE.

The above method further includes:

shielding, by the control module, the ring back tones and ring back images transmitted between the calling UE and the called UE.

The obtaining the voice and image coding formats includes:

stipulating or negotiating the voice and image coding formats between the control module and calling UE in advance.

The playing the ring back tones and ring back images for the calling UE is through a 64 kbps CS traffic channel.

The method is applied in at least one of Wideband Code Division Multiple Access, WCDMA, system, Time Division Synchronous Code Division Multiple Access, TD-SCDMA, system, Public Switched Telephone Network, PSTN, and Internet.

When the method is applied in the WCDMA system or TD-SCDMA system, the control module is Mobile Switching Center, MSC, or Media Gateway, MGW, in a Core Network, CN; and When the method is applied in the PSTN on Internet, the control module is a switch or a router.

When sending the ring back tones and ring back images to the calling UE, shielding UE data instead of forwarding the data to a peer UE, and, maintaining VP links between the CN and UEs.

The system for implementing ring back tones and ring back images in the VP series in another embodiment of the invention comprise: a control module, a calling UE and a called UE, wherein the control module comprise: an acquiring unit, adapted to acquire voice and image coding formats supported by the calling UE in the VP service; and a playing unit, adapted to play the ring back tones and ring back images for the calling UE through a voice and image channel defined in VP series of protocols.

The device for implementing ring back tones and ring back images in the VP service in another embodiment of the invention comprise: an acquiring unit adapted to acquire voice and image coding formats supported by the calling UE in the VP service; and a playing unit, adapted to play the ring back tones and ring back imaged for the calling UE through a voice and image channel defined in VP series of protocols.

The embodiments of the invention provide that the CN uses the voice and image coding formats supported by the calling UE to play ring back tones and ring back images through a voice and image channel defined in the VP series of protocols.

That is, the CN plays ring back tones and ring back images through the voice and image coding formats calling UEs supports for different types of calling UEs. And the embodiments avoid the defect of different playing effects of ring back tones transmitted through the transparent channel on calling UEs, ensure that different UEs can play ring back tones customized by the network, and greatly improve the quality of playing ring back tones in the VP service. Compared with prior technologies that provide ring back tones only, the embodiments of the invention can also provide high-quality ring back images. the embodiments of the invention are more competitive in the market and help operators to launch services and create better user experience.

The invention is hereinafter described in detail with reference to the embodiments and accompanying drawings. It is to be understood that other embodiments may be utilized and structural changes may be made without departing from the scope of the invention.

Figure 1:
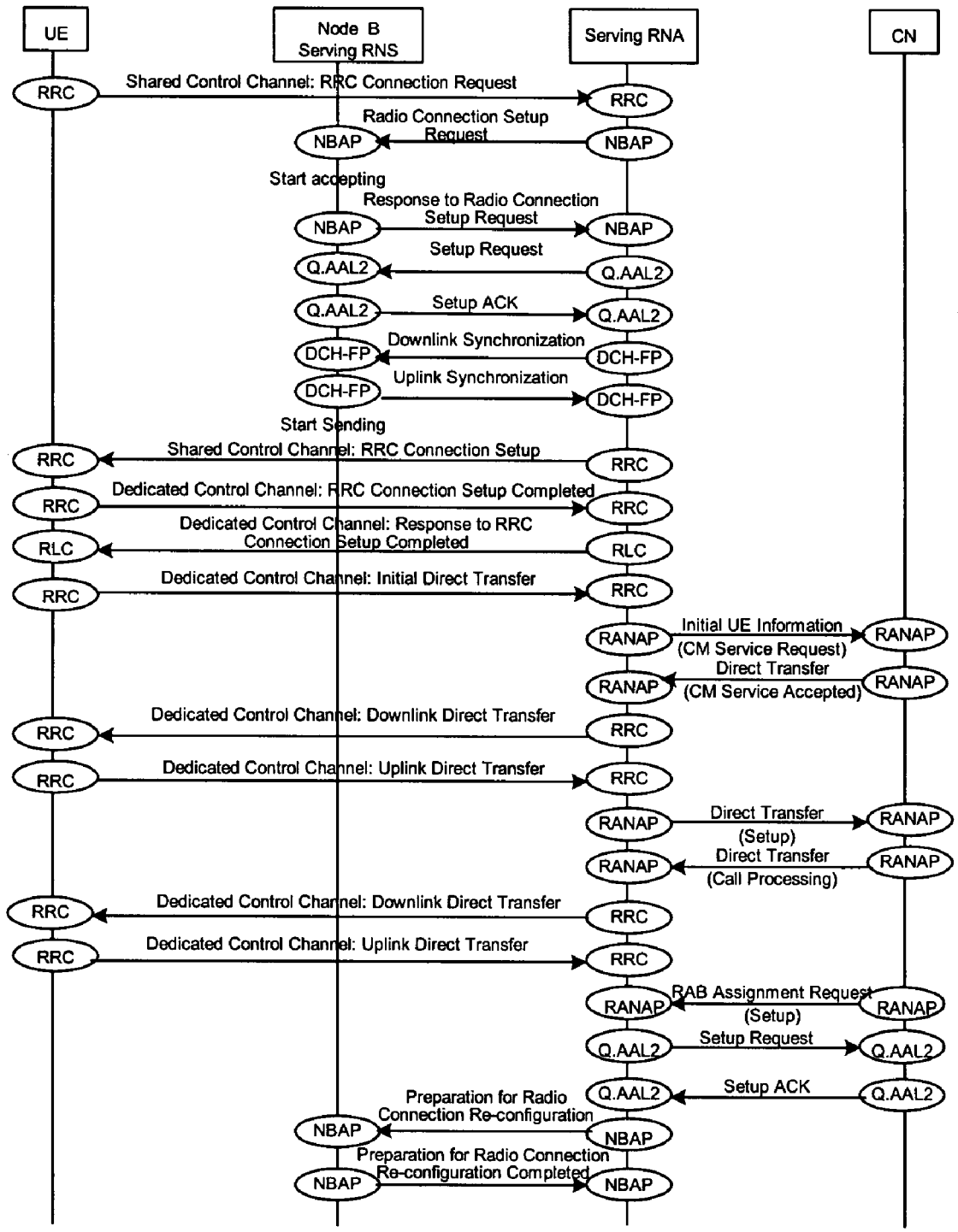
FIG. 1 is the first part of a signaling flowchart for a calling user in the VP service in the prior art.
Figure 2:
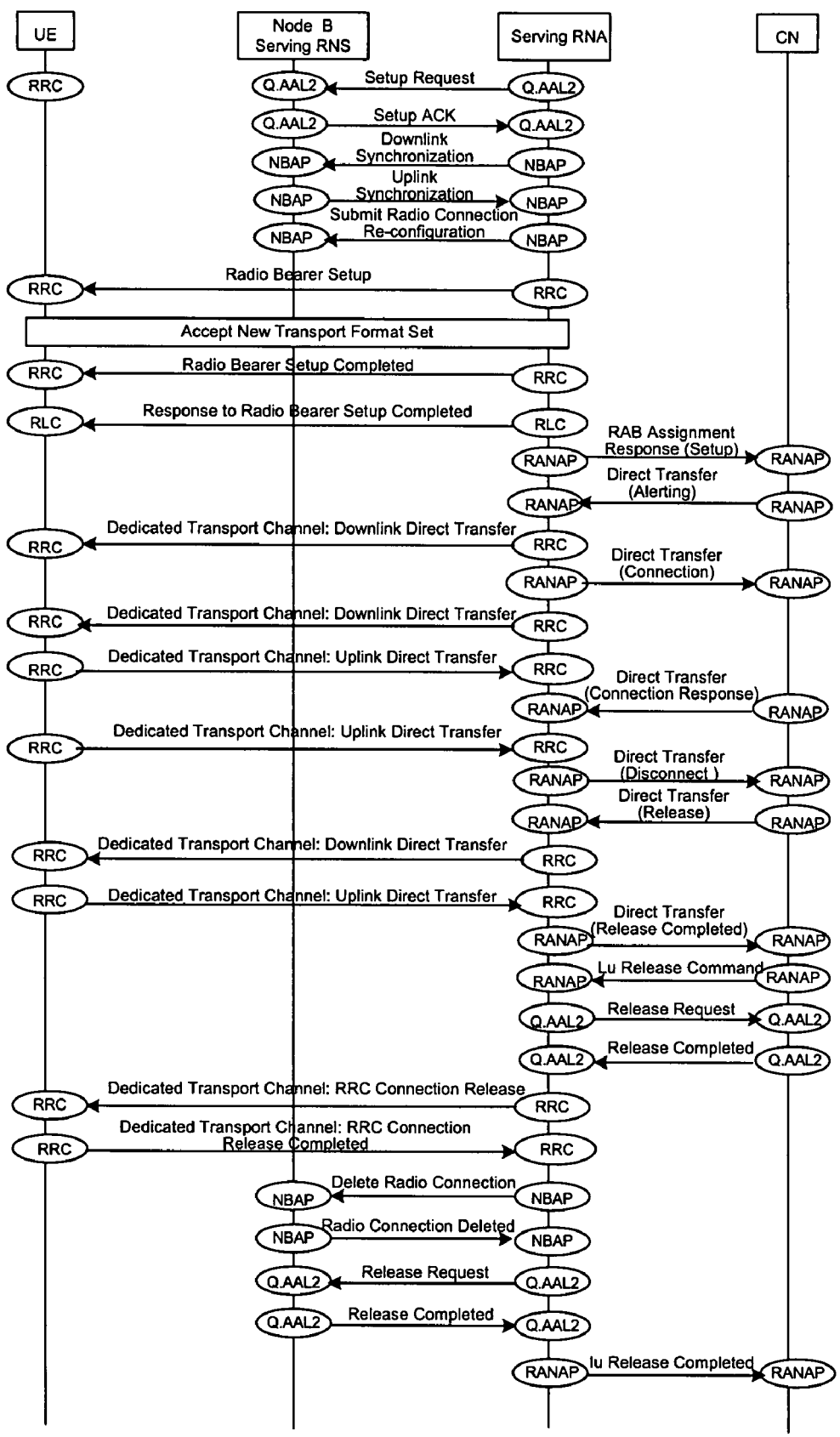
FIG. 2 is the second part of a signaling flowchart for a calling user in the VP service in the prior art.
Figure 3:
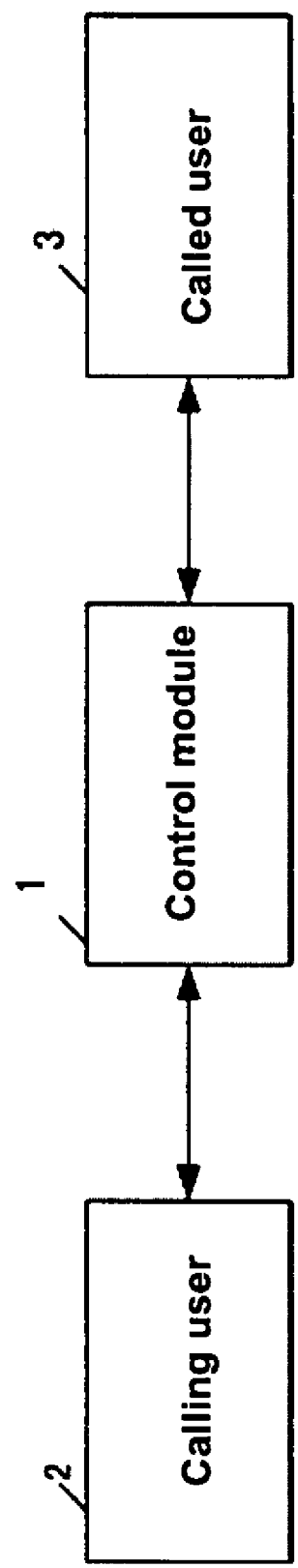
FIG. 3 is a schematic structural diagram of a system for implementing ring back tones and ring back images in the VP service according to an embodiment of the invention.

FIG. 3 shows a schematic structural diagram of a system for implementing ring back tones and ring back images in the VP service according to an embodiment of the invention.

As shown in FIG. 3, the system includes control module 1, calling UE 2, and called UE 3.

Control module 1 obtains the voice and image coding formats supported by calling UE 2 in the VP service when calling UE 2 initiates a call and waits for called UE 3 to answer the call. The control module then uses the coding formats supported by calling UE 2 to play the customized voices and images (ring back tones and ring back images) for calling UE 2.

Control module 1 can obtain the coding formats that calling UE 2 supports by resolving the interactive IFs of the VP service between the calling UE and the called UE or by negotiating with calling UE 2 in advance. In this way, the system can effectively ensure the effect and quality of playing ring back tones and support ring back images. Control module 1 can also obtain the coding formats supported by called UE 3 in the VP service and play the customized voices and images for called UE 3 through a voice and image channel defined in the VP series of protocols.

When the system for implementing ring back tones and ring back images in the VP service is applied in the WCDMA system or TD-SCDMA system, control module 1 may be set in the CN. When the system is applied in the PSTN or Internet, control module 1 may be set on a switch or a router between the calling UE and the called UE.

To better describe the invention, the following describes a preferred embodiment of the invention based on the schematic structural diagram of a system in FIG. 3: It should be pointed out that the embodiment is described based on the assumption that the system is applied in the WCDMA system or TD-SCDMA system.

Figure 4:
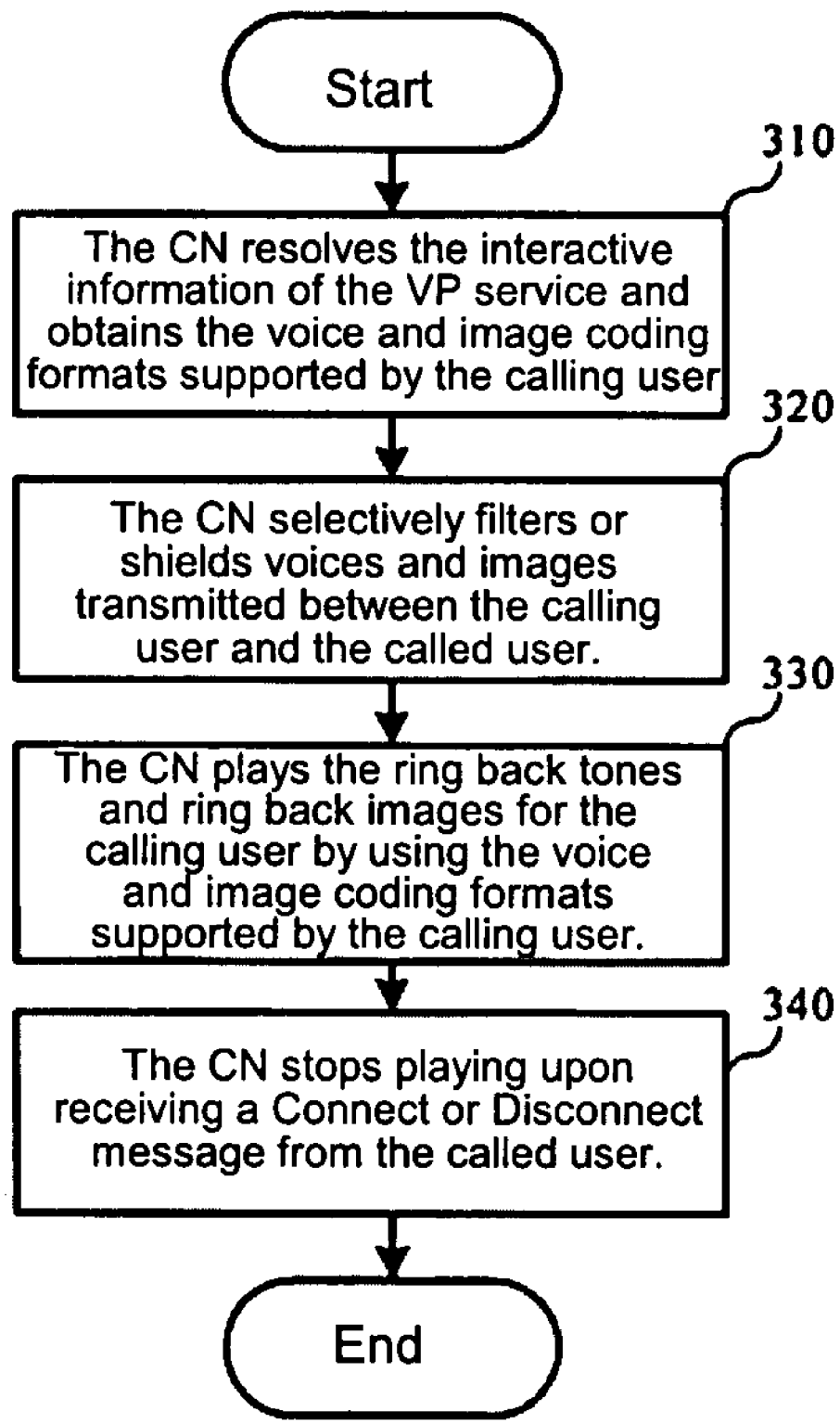
FIG. 4 is a flowchart of a method for implementing ring back tones and ring back images in the 3G system according to an embodiment of the invention.

FIG. 4 shows the flowchart of a method for implementing ring back tones and ring back images in the 3G system in a preferred embodiment of the invention. The method may be executed at the following time: The control module prepares to send a Direct Transfer message for alerting to the RNC or the control module prepares to send a Direct Transfer message for connection to the RNC after receiving an RAB Assignment Response.

310: The CN resolves the interactive protocol information of the VP service between the calling UE and the called UE and obtains the voice and image coding foi mats supported by the calling UE. The interactive information resolved in this step may be the IEs related to the VP service.

320: The CN selectively filters or shields voices and images transmitted between the calling UE and the called UE. It may be understood that the CN must resolve VP series of protocols in the above two steps, that is, the CN is not a transparent channel for the VP series of protocols.

330: The CN uses the voice and image coding formats supported by the calling UE to play the ring back tones and ring back images for the calling UE. The ring back tones and ring back images are customized in the CN and played for the calling UE through a CS 64 kbps traffic channel.

340: The CN stops playing the ring back tones and ring back images upon receiving a Connect or Disconnect message sent by the called UE. The Connect message indicates that the called UE accepts the call from the calling UE, and the Disconnect message indicates that the called UE rejects the call from the calling UE.

Figure 5:
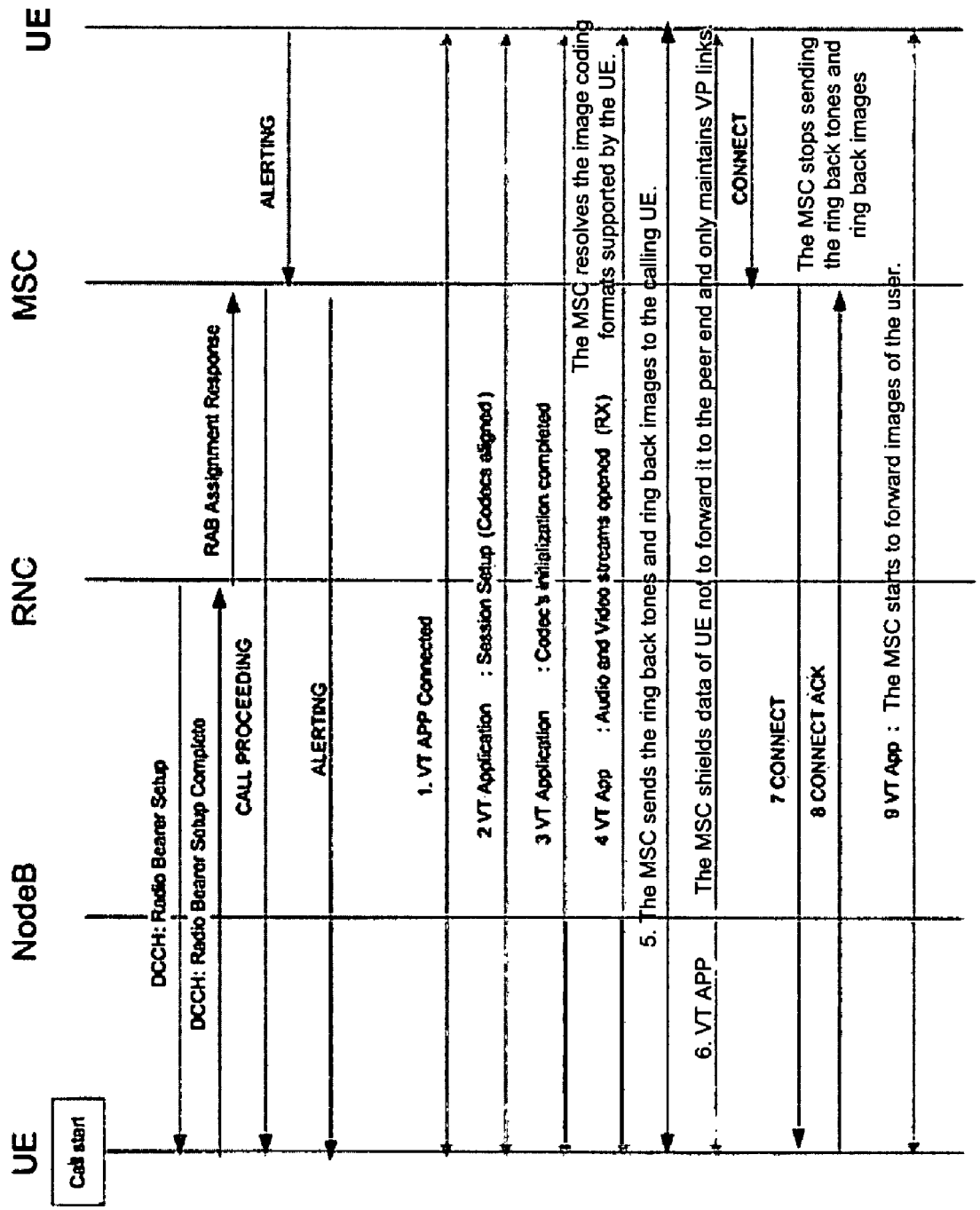
FIG. 5 is a further flowchart of the method for implementing ring back tones and ring back images shown in FIG. 4.

FIG. 5 further explains the flowchart of the method for implementing ring back tones and ring back images shown in FIG. 4.

As shown in FIG. 5, when a Mobile Switching Center (MSC) in the CN prepares to send a Direct Transfer message for alerting to the RNC or before the MSC prepares to send a Direct Transfer message for connection to the RNC after receiving an RAB Assignment Response, the method includes:

1) VT APP Connected: After receiving an Alerting message, the calling UE starts to negotiate setup of a VP APP channel with the called UE.

2) VP Application: Session Setup (Codec aligned): Set up a thread and prepare for the communication between the calling UE and the called UE.

3) VP Application: Codec's initialization: After the calling and called UEs complete negotiation of the coding, the MSC obtains the voice and image coding formats supported by the calling UE by resolving the coding negotiation signaling.

4) VP Audio and Video Stream opened (RX): The audio and video stream port between the calling UE and the called UE is created and is ready to receive images. The MSC knows that the calling and called UEs can send or receive images by resolving the data streams of the process. The above processes are implemented based on protocol interaction information. The protocol interaction information includes the coding negotiation signaling, and the coding negotiation signaling includes the voice and image coding formats supported by the calling UE. Therefore, the MSC can obtain the voice and image formats supported by the calling UE by resolving the protocol interaction information.

5) The MSC starts to send the ring back tones and ring back images to the calling UE.

6) As the MSC is sending the ring back tones and ring back images to the calling UEs, data need not be transferred between the calling UE and the called UE. Therefore, the MSC shields UE data and does not forward the data to the peer end. It only maintains the VP link between the MSC and UEs (and selectively filters or shields voices and images transmitted between the calling UE and the called UE).

7) After receiving a Connect message from the called UE, the MSC forwards the Connect message to the calling UE and stops playing the ring back tones and images.

8) The MSC forwards the Connect ACK message from the calling UE to the called UE.

9) The MSC starts to forward UE data: The calling and called UEs do not receive the ring back tones and images from the MSC any more, and the MSC does not filte or shield data and starts to receive or send data.

Through the above process, the MSC in the CN may play quality-assured ring back tones and ring back images for the calling UE when the UE initiates a VP call the called UE.

It should be noted that the CN includes a Media Gateway (MGW) (used to process user data) and a MSC (used to process control signaling). The MSC can only process control signaling messages (for example, the above coding negotiation signaling) and the control signaling messages are sent to the MSC via the MGW, whereas the MGW can process VP data between control signaling and UEs. Therefore, the process of playing ring back tones and ring back images implemented by the MSC in the CN may also be implemented by the MGW. The process is the same.

Figure 6:
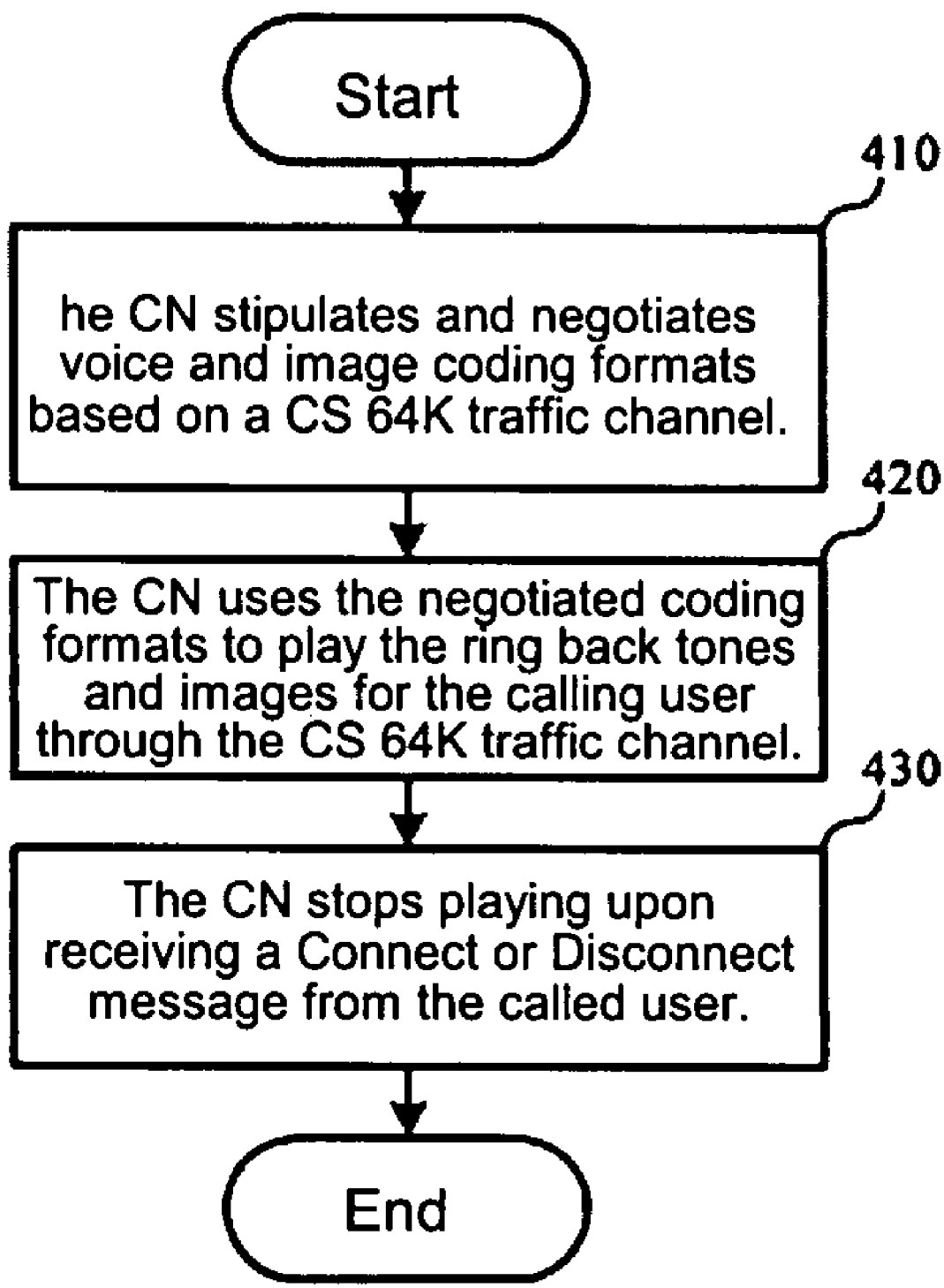
FIG. 6 is the flow of a method for implementing ring back tones and ring back images in the 3G system according to an embodiment of the invention.

Based on the above principle of the invention, in the embodiment of the invention in FIG. 6, another mode is used to obtain the voice and image coding formats supported by the calling UE in the VP service. The same as the above preferred embodiment of the invention, the process shown in FIG. 6 is executed when the CN prepares to send a Direct Transfer message for alerting to the RNC or before the CN prepares to send a Direct Transfer message for connection to the RNC after receiving an RAB Assignment Response.

As shown in FIG. 6, in Step 410, the CN stipulates or negotiates the voice and image coding formats based on a CS 64 kbps traffic channel with the calling UE. It should be noted that this step may be executed at any time after the calling UE initiates a VP call and before the next step starts.

420: The CN plays the ring back tones and ring back images for the calling UE through the CS 64 kbps traffic channel in the voice and image coding formats obtained by negotiation in Step 410. The same as the previous embodiment, the ring back tones and ring back images are customized in the CN and played for the calling UE through the CS 64 kbps traffic channel.

430: The CN stops playing the ring back tones and ring back images upon receiving a Connect or Disconnect message sent by the called UE. The Connect message indicates that the called UE accepts the call from the calling UE, and the Disconnect message indicates that the called UE rejects the call from the calling UE.

When the system for implementing ring back tones and ring back images in the VP service is applied in the PSTN or Internet (for IP calls over the Internet), the process is basically the same as the one described in FIG. 4 and FIG. 5 except that the control module is in the switch or router between the calling UE and the called UE or is a control unit in the switch or router.

Although the invention has been described through some preferred embodiments, those skilled in the art may make various modifications and variations to the invention without departing from the spirit and scope of the invention. And the invention is intended to cover these modifications and variations provided that they fall into the scope of protection defined by the following claims or their equivalents.

What is claimed is:

1. A method for implementing ring back tones and ring back images in a video phone (VP), service in a communication system, the method comprising:

obtaining, by a control module of the communication system, voice and image coding formats supported by a calling User Equipment (UE) in the VP service, by resolving protocol interaction information of the VP service between the calling UE and a called UE;

playing, by the control module, ring back tones and ring back images for the calling UE in the voice and image coding formats supported by the calling UE through a voice and image channel defined in VP series of protocols, wherein the ring back tones and ring back images are customized by a core network (CN) of the communication system.

2. The method of claim 1, wherein, the method is executed when the control module prepares to send a Direct Transfer message for alerting to Radio Network Controller (RNC) or before the control module prepares to send a Direct Transfer message for connection to the RNC after receiving a Radio Access Bearer (RAB) Assignment Response.

3. The method of claim 2, further comprising:
stopping playing the ring back tones and ring back images after receiving a Connect or Disconnect message from the called UE in the VP service.

4. The method of claim 1, wherein the playing the ring back tones and ring back images for the calling UE is through a 64 kbps circuit switching (CS) traffic channel.

5. The method of claim 1, wherein
the method is applied in at least one of a Wideband Code Division Multiple Access (WCDMA) system, and a Time Division Synchronous Code Division Multiple Access (TD-SCDMA) system, and
the control module is a Mobile Switching Center (MSC), or a Media Gateway (MGW) in the CN.

6. The method of claim 1, wherein
the method is applied in a Public Switched Telephone Network (PSTN) system or an Internet system, and
the control module is a switch or a router.

7. A control module in a communication system for implementing ring back tones and ring back images in a video phone (VP) service, the control module comprising:
an acquiring unit, adapted to acquire, by resolving protocol interaction information between a calling user equipment (UE) and a called UE, voice and image coding formats supported by the calling UE in the VP service; and
a playing unit, adapted to play ring back tones and ring back images for the calling UE in the voice and image coding formats supported by the calling UE through a voice and image channel defined in VP series of protocols, wherein the ring back tones and ring back images are customized by a core network (CN) of the communication system.

8. The system control module of claim 7, wherein
the control module is applicable to at least one of a Wideband Code Division Multiple Access (WCDMA) system, or a Time Division Synchronous Code Division Multiple Access (TD-SCDMA) system, and
the control module is a Mobile Switching Center (MSC), or a Media Gateway (MGW).

9. The control module of claim 7, wherein:
the control module is used in a Public Switched Telephone Network (PSTN) or Internet, and
the control module is a switch or a router.

10. The control module of claim 7, wherein the ring back tones and ring back images are played via a 64 kbps circuit switching (CS) traffic channel.

11. A communication network system, comprising:
a core network (CN) communicatively connected with a calling party and a called party, wherein the CN is configured to:
obtain voice and image coding formats supported by the calling party by resolving protocol interaction information between the calling party and the called party,
determine a ring back tone and a ring back image in the voice and image coding formats supported by the calling party, and
play, through a voice and image channel defined in video phone (VP) series of protocol, the ring back tone and ring back image for the calling party.

12. The communication network system of claim 11, wherein the ring back tone and ring back image are played through a 64 kbps circuit switching (CS) traffic channel.

13. The communication network system of claim 11, wherein the network system is a Wideband Code Division Multiple Access (WCDMA) system, or a Time Division Synchronous Code Division Multiple Access (TD-SCDMA) system.

14. The communication network system of claim 12, wherein the voice and image coding formats supported by the calling party are obtained by a Mobile Switching Center (MSC) or a Media Gateway (MGW).

15. The communication network system of claim 11, wherein the network system is a Public Switched Telephone Network (PSTN) system, or an Internet.

16. The communication network system of claim 15, wherein the voice and image coding formats supported by the calling party are obtained by a Mobile Switching Center (MSC) or a Media Gateway (MGW).

* * * * *

UNITED STATES PATENT AND TRADEMARK OFFICE
CERTIFICATE OF CORRECTION

PATENT NO. : 8,275,114 B2  
APPLICATION NO. : 11/886089  
DATED : September 25, 2012  
INVENTOR(S) : Haitao Jiang Page 1 of 1

It is certified that error appears in the above-identified patent and that said Letters Patent is hereby corrected as shown below:

In claim 8, column 7, line 40, "system control" should read -- control --

Signed and Sealed this  
Nineteenth Day of March, 2013

Teresa Stanek Rea  
*Acting Director of the United States Patent and Trademark Office*